United States Patent
Jin et al.

(10) Patent No.: US 9,699,050 B2
(45) Date of Patent: Jul. 4, 2017

(54) METHOD AND APPARATUS FOR LEARNING ONLINE STATE OF TERMINAL

(71) Applicant: Huawei Device Co., Ltd., Shenzhen (CN)

(72) Inventors: Hui Jin, Beijing (CN); Guodong Xue, Shenzhen (CN); Lei Wang, Beijing (CN)

(73) Assignee: Huawei Device Co., Ltd., Shenzhen (CN)

(*) Notice: Subject to any disclaimer, the term of this patent is extended or adjusted under 35 U.S.C. 154(b) by 380 days.

(21) Appl. No.: 14/296,977

(22) Filed: Jun. 5, 2014

(65) Prior Publication Data

US 2014/0289403 A1    Sep. 25, 2014

Related U.S. Application Data

(63) Continuation of application No. PCT/CN2012/081458, filed on Sep. 17, 2012.

(30) Foreign Application Priority Data

Dec. 7, 2011 (CN) .......................... 2011 1 0403634
Jun. 29, 2012 (CN) .......................... 2012 1 0222149

(51) Int. Cl.
  *G06F 15/173* (2006.01)
  *H04L 12/26* (2006.01)
  (Continued)

(52) U.S. Cl.
  CPC ........ *H04L 43/0811* (2013.01); *H04L 67/142* (2013.01); *H04L 67/145* (2013.01);
  (Continued)

(58) Field of Classification Search
  USPC ....... 709/203, 219, 227, 206, 217, 223, 224, 709/226, 228, 231, 232; 726/28
  See application file for complete search history.

(56) References Cited

U.S. PATENT DOCUMENTS 6,128,644 A * 10/2000 Nozaki ................... G06F 9/505
                                                                   709/203
7,283,805 B2 * 10/2007 Agrawal ............... H04L 12/581
                                                                   709/219
(Continued)

FOREIGN PATENT DOCUMENTS

| CN | 102025519 A | 4/2011 |
| CN | 102572939 A | 7/2012 |
| WO | 2011137792 A1 | 11/2011 |

OTHER PUBLICATIONS

Foreign Communication From a Counterpart Application, PCT Application No. PCT/CN2012/081458, English Translation of International Search Report dated Dec. 27, 2012, 3 pages.
(Continued)

*Primary Examiner* — Quang N Nguyen
(74) *Attorney, Agent, or Firm* — Conley Rose, P.C.

(57) ABSTRACT

A method and an apparatus for learning an online state of a terminal are provided. In the embodiments of the present invention, when an online state of a terminal needs to be reported to a network side, the terminal sends a first message to a core network management entity, where the first message includes first indication information, so that the core network management entity sends the first indication information to a proxy server, and thereby the proxy server learns an online state of an application on the terminal, so as to avoid that an online state, of the application on the terminal, saved in the proxy server is incorrect.

12 Claims, 10 Drawing Sheets

(51) Int. Cl.
  *H04L 29/08* (2006.01)
  *H04W 60/00* (2009.01)
(52) U.S. Cl.
  CPC .............. *H04L 67/22* (2013.01); *H04L 67/28* (2013.01); *H04W 60/00* (2013.01)

(56) References Cited

U.S. PATENT DOCUMENTS

| | | |
|---|---|---|
| 8,798,524 B2 * | 8/2014 | Saros ................. H04L 12/1859 726/28 |
| 2002/0083127 A1 | 6/2002 | Agrawal |
| 2006/0026286 A1 * | 2/2006 | Lei ...................... G06F 12/0875 709/227 |
| 2009/0061904 A1 | 3/2009 | Emrich et al. |
| 2013/0144954 A1 | 6/2013 | Li et al. |

OTHER PUBLICATIONS

Foreign Communication From a Counterpart Application, PCT Application No. PCT/CN2012/081458, English Translation of Written Opinion dated Dec. 27, 2012, 19 pages.
Foreign Communication From a Counterpart Application, European Application No. 12856098.4, Extended European Search Report dated Jun. 29, 2015, 6 pages.

* cited by examiner

METHOD AND APPARATUS FOR LEARNING ONLINE STATE OF TERMINAL

CROSS-REFERENCE TO RELATED APPLICATIONS

This application is a continuation of International Application No. PCT/CN2012/081458, filed on Sep. 17, 2012, which claims priority to Chinese Patent Application No. 201110403634.8, filed on Dec. 7, 2011 and Chinese Patent Application No. 201210222149.5, filed on Jun. 29, 2012, all of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to the field of communications technologies, and in particular, to a method and an apparatus for learning an online state of a terminal.

BACKGROUND

Currently, applications, particularly some applications related to mobile Internet, such as instant messaging (IM), electronic mail (Email), and social network service (SNS), exist on a smartphone. An application on a terminal needs to communicate with an application server on a network side, and the application on the terminal keeps a network connection between the application and the application server effective in a long time in a manner of sending a piece of online information to the application server at intervals, namely, by using a heartbeat mechanism, thereby ensuring that when data is sent from the application server to the terminal, the data can reach the terminal accurately and in time. When no data is sent on a Packet Data Protocol (PDP) connection of the terminal in a period of time, to save power, the PDP connection is released, but when there is data to send, the PDP connection needs to be reestablished. Therefore, to send a heartbeat message, the terminal continuously performs a process of establishing and releasing the PDP connection, resulting in a signaling storm.

Currently, the industry proposes a push solution to solve the signaling storm problem. The core idea of the solution is to set a proxy server such as an always online architecture (AOI) server, a Push server or a services capability server (SCS) on a network side. A heartbeat message does not need to be kept between an application on a terminal and an application server, and the proxy server replaces the application to keep the heartbeat message between the application and the application server, thereby avoiding a process of continuously establishing and releasing a PDP connection of the terminal, and alleviating a network burden. However, when no data is sent from the terminal to the network side, the PDP connection is disconnected and no connection exists between the terminal and the proxy server. In this case, the proxy server cannot perceive whether the application is reachable, and therefore, an online state of the application reported by the proxy server to the application server may be incorrect.

SUMMARY

To solve the foregoing problem, embodiments of the present invention provide a method and an apparatus for learning an online state of a terminal.

According to an aspect, an embodiment of the present invention provides a method for sending an online state of a terminal, where the method includes: sending a first message to a core network management entity, where the first message includes first indication information, so that the core network management entity sends the first indication information to a proxy server, and thereby the proxy server learns an online state of one or more applications on the terminal at least according to the first indication information; or so that the core network management entity generates second indication information at least according to the first indication information, and sends the second indication information to a proxy server, and thereby the proxy server learns an online state of one or more applications on the terminal at least according to the second indication information.

According to another aspect, an embodiment of the present invention further provides a method for sending an online state of a terminal, where the method includes: receiving a first message sent by the terminal, where the first message includes first indication information; obtaining an address of a proxy server; and sending the first indication information to the proxy server corresponding to the address, so that the proxy server learns an online state of one or more applications on the terminal at least according to the first indication information; or generating second indication information at least according to the first indication information, and sending the second indication information to the proxy server corresponding to the address, so that the proxy server learns an online state of one or more applications on the terminal at least according to the second indication information.

According to another aspect, an embodiment of the present invention further provides a method for learning an online state of a terminal, where the method includes: receiving a message, where the message includes indication information; learning an online state of one or more applications on the terminal at least according to the indication information; and determining, according to the online state of the one or more applications on the terminal, one or more application servers with which communication needs to be terminated, and sending an offline message to the one or more application servers with which communication needs to be terminated, so that the one or more application servers learn that the one or more applications corresponding to the one or more application servers on the terminal are already in an offline state; or determining, according to the online state of the one or more applications on the terminal, one or more application servers with which communication needs to be maintained, and maintaining communication with the one or more application servers with which communication needs to be maintained.

According to another aspect, an embodiment of the present invention further provides a method for maintaining an online state of a terminal, where the method includes: detecting whether one or more applications on the terminal have registered with a proxy server; when the one or more applications have registered with the proxy server, intercepting a message sent by the one or more applications; determining whether the intercepted message is a heartbeat message; and if the intercepted message is a heartbeat message, sending a pseudo heartbeat response message to the one or more applications corresponding to the heartbeat message.

According to another aspect, an embodiment of the present invention further provides a terminal, including a determining unit, a message generating unit, and a sending unit, where the determining unit is configured to determine whether a first message needs to be sent to a core network management entity; the message generating unit is configured to: when a determining result of the determining unit is yes, generate the first message, where the first message includes first indication information, so that the core network management entity sends the first indication information to a proxy server, and thereby the proxy server learns an online state of one or more applications on the terminal; or, so that the core network management entity generates second indication information at least according to the first indication information, and sends the second indication information to a proxy server, and thereby the proxy server learns an online state of one or more applications on the terminal; and the sending unit is configured to send the first message generated by the message generating unit to the core network management entity.

According to another aspect, an embodiment of the present invention further provides a core network management entity, including a receiving unit, an address obtaining unit, and a sending unit, where the receiving unit is configured to receive a first message sent by a terminal, where the first message includes first indication information; the address obtaining unit is configured to obtain an address of a proxy server; and the sending unit is configured to send the first indication information to the proxy server corresponding to the address, so that the proxy server learns an online state of one or more applications on the terminal at least according to the first indication information; or the core network management entity further includes a second indication message generating unit, where the second indication message generating unit generates second indication information at least according to the first indication information received by the receiving unit; the sending unit is configured to send the second indication information to the proxy server corresponding to the address, so that the proxy server learns an online state of one or more applications on the terminal at least according to the second indication information.

According to another aspect, an embodiment of the present invention further provides a proxy server, including a receiving unit, a determining unit, and a communications unit, where the receiving unit is configured to receive a message sent by a core network management entity, where the message includes indication information; the determining unit is configured to learn an online state of one or more applications on a terminal at least according to the indication information received by the receiving unit; and the communications unit is configured to determine, according to the online state of the one or more applications on the terminal, one or more application servers with which communication needs to be terminated, and send an offline message to the one or more application servers with which communication needs to be terminated, so that the one or more application servers learn that the one or more applications corresponding to the one or more application servers on the terminal are already in an offline state; or determine, according to the online state of the one or more applications on the terminal, one or more application servers with which communication needs to be maintained, and maintain communication with the one or more application servers with which communication needs to be maintained.

According to another aspect, an embodiment of the present invention further provides a terminal, including a detecting unit, an intercepting unit, a determining unit, and a sending unit, where the detecting unit is configured to detect whether one or more applications on the terminal have registered with a proxy server; the intercepting unit is configured to: when the detecting unit detects that the one or more applications have registered with the proxy server, intercept a message that is generated by the one or more applications and sent by the terminal; the determining unit is configured to determine whether the message intercepted by the intercepting unit is a heartbeat message; and the sending unit is configured to send a pseudo heartbeat response message to the one or more applications corresponding to the heartbeat message.

In the embodiments of the present invention, when an online state of a terminal needs to be reported to a network side, the terminal sends a first message to a core network management entity, where the first message includes first indication information, so that the core network management entity sends the first indication information to a proxy server, and thereby the proxy server learns an online state of one or more applications on the terminal at least according to the first indication information; or so that the core network management entity generates second indication information at least according to the first indication information, and sends the second indication information to a proxy server, and thereby the proxy server learns an online state of one or more applications on the terminal at least according to the second indication information, so as to avoid that an online state, of the application on the terminal, saved in the proxy server is incorrect.

BRIEF DESCRIPTION OF THE DRAWINGS

To describe the technical solutions in the embodiments of the present invention more clearly, the following briefly introduces the accompanying drawings required for describing the embodiments or the prior art. The accompanying drawings in the following description show some embodiments of the present invention, and a person of ordinary skill in the art may still derive other drawings from these accompanying drawings without creative efforts.

DETAILED DESCRIPTION

Figure 1:
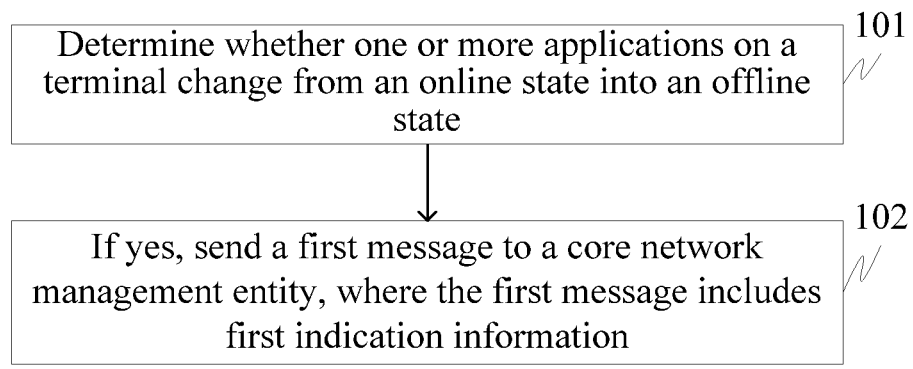
FIG. 1 is a flowchart of a method for sending an online state of a terminal according to Embodiment 1 of the present invention.

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

First, words and terms in the following embodiments are explained.

When ordinal numbers such as "first" and "second" are mentioned in the embodiments of the present invention, the ordinal numbers should be understood to be merely used for distinguishing unless the ordinal numbers really express a meaning of sequence according to context.

When "an application" is mentioned in the embodiments of the present invention, it refers to that the application needs to maintain communication with a proxy server, so that the proxy server learns an online state of the application, and informs an application server corresponding to the application of the online state of the application as required. Moreover, when the application server corresponding to the application has data to send to the application, the application server may send the data to the application by using the proxy server. Specifically, this refers to software or a functional module on a terminal side for an application related to the mobile Internet. An application may be a piece of independent application software, or may also be a functional module of a mobile phone. For example, for a mail application, an application may be software installed on a mobile phone and used for receiving mail.

When "an online state" is mentioned in the embodiments of the present invention, it refers to a running state of an application on a terminal. If the application is run, the application is online, and if the application is stopped, the application is offline. Alternatively, it refers to a registration state, of an application on a terminal, on a proxy server. If the application is registered, the application is online, and if the application is not registered, the application is offline. Alternatively, it refers to a registration state of an application on middleware, where the middleware corresponds to a proxy server and is on a terminal. If the application is registered, the application is online, and if the application is not registered, the application is offline. Therefore, the proxy server may learn whether the application on the terminal is reachable.

When "a proxy server" is mentioned in the embodiments of the present invention, it refers to a network element, of a core network, located between an application on a terminal and a server corresponding to the application. When the application server has data to send to the application, the application server may first send the data to the proxy server, and the proxy server sends the data to the terminal. The proxy server is an entity of the core network. Other entities of the core network may exist between the proxy server and a core network management entity, and when the present invention describes that the core network management entity sends a message to the proxy server, the message may pass through other network elements of the core network.

When "an address of a proxy server" is mentioned in the embodiments of the present invention, it includes, but is not limited to, the following several types: an identifier of a proxy server, an Internet Protocol (IP) address of a proxy server, a name of a proxy server, an internal code of a proxy server and the like. Other network elements may send a message to a proxy server by using an address of the proxy server.

When "a core network management entity" is mentioned in the embodiments of the present invention, it refers to an entity that is located on a core network side and is capable of interacting with a terminal by using a non access stratum (NAS) message. It includes, but is not limited to, a serving general packet radio service support node (SGSN), a mobile management entity (MME), or a mobile switch center (MSC).

When "a location update request message" is mentioned in the embodiments of the present invention, it refers to a request message sent to a core network management entity on a network side when a location of a terminal is changed or a time of periodic location update is reached. It includes, but is not limited to, a tracking area update request (TAU) message, a routing area update request (RAU) message, or a location area update request (LAU) message.

When "indication information" is mentioned in the embodiments of the present invention, it may refer to certain specific information, or may also be a set of information. For example, the indication information may be information about an application; may also be a set of information about an application and a piece of indication information; or may also be a set of information about an application, a piece of indication information, and a terminal identifier.

When "information about an application" is mentioned in the embodiments of the present invention, it may refer to an application identifier (App ID), or an application indication (App indication), or an application name, or an application description. Its objective is to uniquely find the application by using the information about the application.

The technical solutions of the present invention may be applied to various mobile communications systems, such as: a Global System for Mobile Communications (GSM), a General Packet Radio Service (GPRS) system, a Code Division Multiple Access (CDMA) system, a CDMA2000 system, a Wideband Code Division Multiple Access (WCDMA) system, a Long Term Evolution (LTE) system, a world interoperability for microwave access (WiMAX) system and the like.

Embodiment 1

An application on a terminal needs to maintain contact with an application server during running, so that the application server learns whether the application on the terminal is online, namely, whether the application is in a reachable state, and thereby information exchange between the terminal and the application server may be performed in time.

A proxy server replaces the application to maintain communication between the application and the application server, and when the terminal needs to report an online state of one or more applications on the terminal to a network side, the terminal sends a first message to a core network management entity, where the first message includes first indication information, so that the core network management entity sends the first indication information to the proxy server, and thereby the proxy server learns the online state of the one or more applications on the terminal at least according to the first indication information; or the terminal sends a first message to a core network management entity, where the first message includes first indication information, so that the core network management entity generates second indication information at least according to the first indication information, and sends the second indication information to the proxy server, and thereby the proxy server learns the online state of the one or more applications on the terminal at least according to the second indication information.

Specifically, when one or more applications on the terminal change from an online state into an offline state, that the one or more applications are already offline, or an information list of all applications in an online state on the terminal (for example, an identifier list of applications) needs to be reported to the network side; when one or more applications on the terminal change from an offline state into an online state, that the one or more applications are already online, or an information list of all applications in an online state on the terminal needs to be reported to the network side; when the terminal receives a power-off instruction or an airplane mode instruction, all applications on the terminal are about to terminate communication with the network side, that all the applications on the terminal are already offline, that the terminal is already unreachable, or an empty application information list needs to be reported to the network side; when the terminal sends a location update request message to the core network management entity due to periodic update or location update, and an online application exists on the terminal, an indication that an online state of all applications on the terminal is not changed, or an indication that the terminal is reachable, or an information list of all the applications in an online state on the terminal needs to be reported to the network side.

FIG. 1 is a flowchart of a method for sending an online state of a terminal according to the embodiment of the present invention. In this embodiment of the present invention, when one or more applications on a terminal change from an online state into an offline state, a first message is sent to a core network management entity, where the first message includes first indication information, so that the core network management entity sends the first indication information to a proxy server, and thereby the proxy server learns an online state of one or more applications on the terminal at least according to the first indication information. Specifically, the method includes:

Step 101: Determine whether one or more applications on the terminal change from an online state into an offline state.

When the one or more applications on the terminal change from the online state into the offline state, the proxy server needs to be notified, so that the proxy server learns that the one or more applications are already offline, thereby terminating communication with one or more application servers corresponding to the one or more applications or informing the one or more application servers that the applications on the terminal are already offline.

Step 102: If the one or more applications on the terminal change from an online state into an offline state, send the first message to the core network management entity, where the first message includes the first indication information, so that the core network management entity sends the first indication information to the proxy server, and thereby the proxy server learns the online state of the one or more applications on the terminal at least according to the first indication information. The first message may be a location update request message, or a service request message, or an uplink generic NAS transport message, or an uplink NAS transport message. When the first message is an uplink generic NAS transport message or an uplink NAS transport message, after sending a location update request message or a service request message to the core network management entity, the terminal sends the first message. The first indication information specifically includes information about one or more applications changing from an online state into an offline state on the terminal (for example, an App ID or an App indication), or information about and an offline indication of the one or more applications changing into an offline state on the terminal, or information about the one or more applications changing into an offline state on the terminal and information about changing from an online state into an offline state, or an information list of all applications in an online state on the terminal.

Alternatively, if the one or more applications on the terminal change from an online state into an offline state, the first message is sent to the core network management entity, where the first message includes the first indication information, so that the core network management entity generates second indication information at least according to the first indication information, and sends the second indication information to the proxy server, and thereby the proxy server learns the online state of the one or more applications on the terminal at least according to the second indication information. The first message may be a location update request message, or a service request message, or an uplink generic NAS transport message, or an uplink NAS transport message. When the first message is an uplink generic NAS transport message or an uplink NAS transport message, after sending a location update request message or a service request message to the core network management entity, the terminal sends the first message. The first indication information specifically includes information about one or more applications changing from an online state into an offline state on the terminal, or information about and an offline indication of the one or more applications changing into an offline state on the terminal, or information about the one or more applications changing into an offline state on the terminal and information about the change from an online state into an offline state, or an information list of all applications in an online state on the terminal.

If the second indication information needs to be generated according to the first indication information, a coding manner of the first indication information may be changed to generate the second indication information. For example, because the amount of data that a location update request message can carry is limited, information about an application in the first indication information may be compressed and coded, and the core network management entity decompresses the compressed and coded information about the application to generate normal information about the application.

Similarly, if one or more applications on the terminal change from an offline state into an online state, the first message is sent to the core network management entity, where the first message includes information about one or more applications changing from an offline state into an online state on the terminal, or information about and an online indication of one or more applications changing into an online state on the terminal, or information about one or more applications changing into an online state on the terminal and information about changing from an offline state into an online state, or an information list of all applications in an online state on the terminal. The first message may be a location update request message, or a service request message, or an uplink generic NAS transport message, or an uplink NAS transport message. When the first message is an uplink generic NAS transport message or an uplink NAS transport message, after sending a location update request message or a service request message to the core network management entity, the terminal sends the first message.

Specifically, for a third generation (3G) network, the core network management entity may be an SGSN, and the location update request message may be an RAU request message; or, the core network management entity may be a mobile switch center (MSC), and the location update request message may be an LAU request message; while for a fourth generation (4G) network, the core network management entity may be a mobile management entity (MME), and the location update request message may be a TAU request message.

In this embodiment of the present invention, when one or more applications on a terminal change from an online state into an offline state, a first message is sent to a core network management entity, where the first message includes first indication information, so that the core network management entity sends the first indication information to a proxy server; or the core network management entity generates second indication information at least according to the first indication information, and sends the second indication information to a proxy server, so that the proxy server learns an online state of one or more applications on the terminal, so as to avoid that an online state, of the application on the terminal, saved in the proxy server is incorrect.

Figure 2:
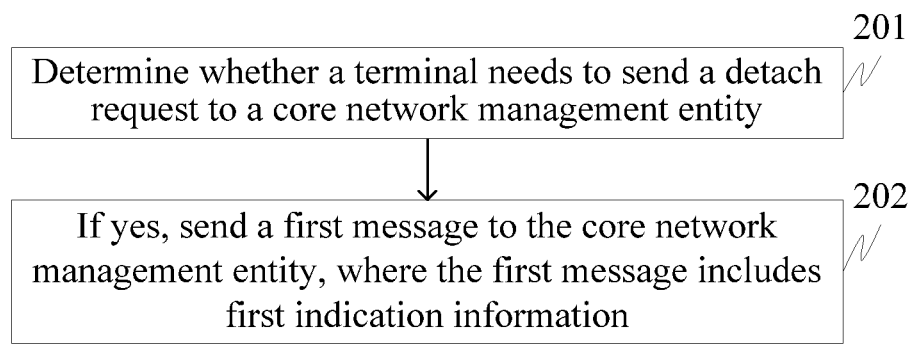
FIG. 2 is a flowchart of another method for sending an online state of a terminal according to Embodiment 1 of the present invention.

FIG. 2 is a flowchart of another method for sending an online state of a terminal according to the embodiment of the present invention. In this embodiment of the present invention, when the terminal learns that a detach request message needs to be sent to a core network management entity, a first message is sent to the core network management entity, where the first message includes first indication information, so that the core network management entity sends the first indication information to a proxy server, and thereby the proxy server learns an online state of one or more applications on the terminal at least according to the first indication information; or so that the core network management entity generates second indication information at least according to the first indication information, and sends the second indication information to a proxy server, and thereby the proxy server learns an online state of one or more applications on the terminal at least according to the second indication information. Specifically, the method includes:

Step 201: Determine whether the terminal needs to send the detach request to the core network management entity. The step may specifically be that the terminal determines whether a power-off instruction or an instruction for enabling an airplane mode is received.

Step 202: If the terminal needs to send the detach request to the core network management entity, send the first message to the core network management entity, where the first message may be a detach message, or an uplink generic NAS transport message, or an uplink NAS transport message. When the first message is an uplink generic NAS transport message or an uplink NAS transport message, after sending the detach request message to the core network management entity, the terminal sends the first message. The first message includes the first indication information, so that the core network management entity sends the first indication information to the proxy server, and thereby the proxy server learns the online state of the one or more applications on the terminal at least according to the first indication information; or so that the core network management entity generates the second indication information at least according to the first indication information, and sends the second indication information to the proxy server, and thereby the proxy server learns the online state of the one or more applications on the terminal at least according to the second indication information.

Specifically, the first indication information may be an indication that all applications on the terminal are offline, or an indication that the terminal is unreachable, or an empty application information list. For example, when the first message is a detach request (detach) message, an Inform Proxy information element is added to the detach message, or an Inform Proxy indication is added to an Evolved Packet System Mobility Management (EMM) cause information element in the detach message, the Inform Proxy includes an indication that all applications on the terminal are offline, or an indication that the terminal is unreachable, or an empty application information list, and the empty application information list is used for indicating that no application still in an online state exists on the terminal. When the terminal receives a power-off instruction or an instruction for enabling an airplane mode, all applications on the terminal change into an offline state, a detach message is sent to the core network management entity, and after receiving the detach message, the core network management entity may learn, according to indication information in the detach message or the empty application information list, that an indication message needs to be sent to the proxy server, so that the proxy server learns that all the applications on the terminal are offline.

Specifically, for a 3G network, the core network management entity may be an SGSN; for a 4G network, the core network management entity may be an MME.

In this embodiment of the present invention, when a terminal learns that a detach request message needs to be sent to a core network management entity, the terminal sends a first message to the core network management entity, where the first message includes first indication information, so that the core network management entity sends the first indication information to a proxy server, and thereby the proxy server learns an online state of an application on the terminal at least according to the first indication information; or the core network management entity generates second indication information at least according to the first indication information, and sends the second indication information to a proxy server, so that the proxy server learns an online state of an application on the terminal at least according to the second indication information, so as to avoid that an online state, of the application on the terminal, saved in the proxy server is incorrect.

Figure 3:
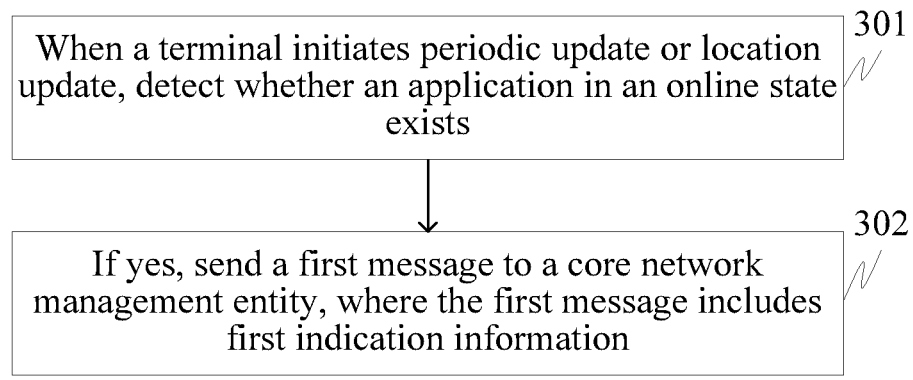
FIG. 3 is a flowchart of another method for sending an online state of a terminal according to Embodiment 1 of the present invention.

FIG. 3 is a flowchart of another method for sending an online state of a terminal according to the embodiment of the present invention. In this embodiment of the present invention, when the terminal learns that a location update request message needs to be sent to a core network management entity, an application in an online state exists on the terminal, and a first message is sent to the core network management entity, where the first message includes first indication information, so that the core network management entity sends the first indication information to a proxy server, and thereby the proxy server learns an online state of the application on the terminal; or so that the core network management entity generates second indication information at least according to the first indication information, and sends the second indication information to a proxy server, and thereby the proxy server learns an online state of the application on the terminal. Specifically, the method includes:

Step 301: When the terminal initiates periodic update or location update, detect whether an application in an online state exists.

Step 302: If the application in an online state exists, send the first message to the core network management entity, where the first message may be a location update request message, or an uplink generic NAS transport message, or an uplink NAS transport message. When the first message is an uplink generic NAS transport message or an uplink NAS transport message, after sending the location update request message to the core network management entity, the terminal sends the first message. The first message includes the first indication information, so that the core network management entity sends the first indication information to the proxy server, and thereby the proxy server learns the online state of the application on the terminal; or so that the core network management entity generates second indication information at least according to the first indication information, and sends the second indication information to the proxy server, and thereby the proxy server learns the online state of the application on the terminal.

Preferably, the first indication information may be an indication that an online state of all applications on the terminal is not changed, or an indication that the terminal is reachable, or an information list of all applications in an online state on the terminal. For example, when the first message is a location update request message, an Inform Proxy information element is added to the location update request message, and the Inform Proxy includes an indication that an online state of all applications on the terminal is not changed, or an indication that the terminal is reachable, or an information list of all applications in an online state on the terminal.

Specifically, for a 3G network, the core network management entity may be an SGSN, and the location update request message may be an RAU request message; or, the core network management entity may be an MSC, and the location update request message may be an LAU request message; while for a 4G network, the core network management entity may be an MME, and the location update request message may be a TAU request message.

In this embodiment of the present invention, when a terminal learns that a location update request message needs to be sent to a core network management entity due to periodic update or location update, an application in an online state exists on the terminal, and a first message is sent to the core network management entity, where the first message includes first indication information, so that the core network management entity sends the first indication information to a proxy server, and thereby the proxy server learns an online state of the application on the terminal; or the core network management entity generates second indication information at least according to the first indication information, and sends the second indication information to a proxy server, so that the proxy server learns an online state of an application on the terminal, so as to avoid that an online state, of the application on the terminal, saved in the proxy server is incorrect. Moreover, an online state of an application on the terminal is reported to a network side during periodic update or location update by using the first message, thereby reducing the number of times of information exchange, reducing data traffic, and saving power resources of the terminal.

Embodiment 2

Figure 4:
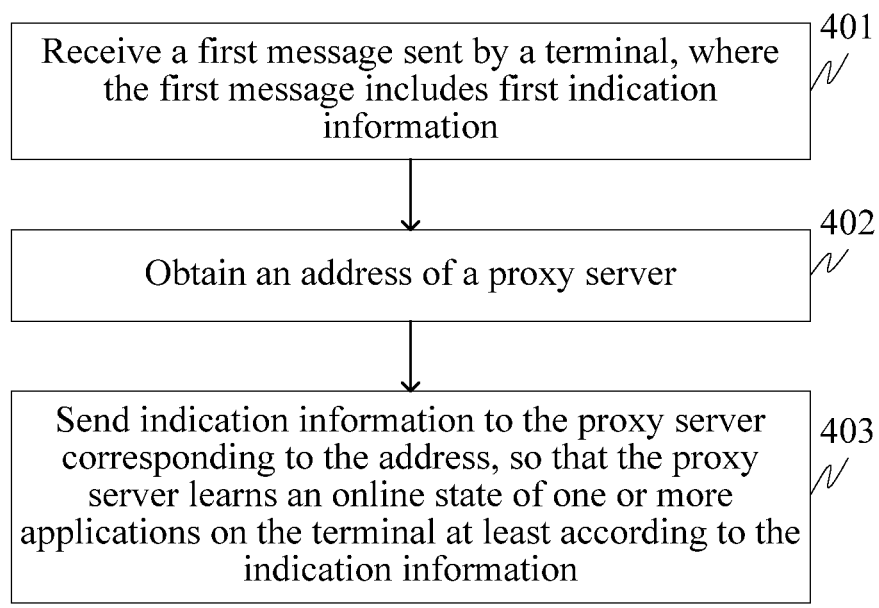
FIG. 4 is a flowchart of another method for sending an online state of a terminal according to Embodiment 2 of the present invention.

FIG. 4 is a flowchart of another method for sending an online state of a terminal according to the embodiment of the present invention. In this embodiment of the present invention, a core network management entity receives a first message of the terminal, where the first message includes first indication information, and obtains an address of a proxy server; and sends the first indication information to the proxy server corresponding to the address, so that the proxy server learns an online state of one or more applications on the terminal at least according to the first indication information; or generates second indication information at least according to the first indication information, and sends the second indication information to the proxy server corresponding to the address, so that the proxy server learns an online state of one or more applications on the terminal at least according to the second indication information. The method specifically includes:

Step 401: Receive the first message sent by the terminal, where the first message includes the first indication information.

When one or more applications on the terminal change from an online state into an offline state, that the one or more applications are already offline needs to be reported to a network side, and thereby communication with one or more application servers corresponding to the one or more applications is terminated or the one or more application servers is informed that the application on the terminal is already offline; or when one or more applications on the terminal change from an offline state into an online state, that the one or more applications are already online needs to be reported to a network side, and thereby communication with one or more application servers corresponding to the one or more applications is performed or the one or more application servers is informed that the application on the terminal is already online; or when the terminal learns that a detach request message needs to be sent to the core network management entity, all applications on the terminal are about to terminate communication with a network side, and that all the applications on the terminal are already offline needs to be reported to the network side; when the terminal learns that a location update request message needs to be sent to the core network management entity due to periodic update or location update, an application in an online state exists on the terminal, and all applications in an online state on the terminal need to be reported to the network side.

The core network management entity receives the first message sent by the terminal, where the first message includes the first indication information, so that the core network management entity sends the first indication information to the proxy server, and thereby the proxy server learns the online state of the one or more applications on the terminal at least according to the first indication information; or the core network management entity receives the first message sent by the terminal, where the first message includes the first indication information, and the core network management entity generates the second indication information at least according to the first indication information, and sends the second indication information to the proxy server, so that the proxy server learns the online state of the one or more applications on the terminal at least according to the second indication information.

The core network management entity receives the first message, where the first message may be a location update request message, or a service request message, or an uplink generic NAS transport message, or an uplink NAS transport message. When the first message is an uplink generic NAS transport message or an uplink NAS transport message, after sending a location update request message or a service request message to the core network management entity, the terminal sends the first message. The first message includes information about one or more applications (App) changing into an offline state on the terminal (for example, an App ID), or information about and an offline indication of the one or more applications changing into an offline state on the terminal, or information about the one or more applications changing into an offline state on the terminal and information about changing from an online state into an offline state, or an information list of all applications in an online state on the terminal (for example, an App ID list), where the one or more applications on the terminal change from an online state into an offline state; or the first message includes information about one or more applications changing into an online state on the terminal, or information about and an online indication of one or more applications changing into an online state on the terminal, or information about one or more applications changing into an online state on the terminal and information about changing from an offline state into an online state, or an information list of all applications in an online state on the terminal, where the one or more applications on the terminal change from an offline state into an online state.

Alternatively, the first message is a detach request message, or an uplink generic NAS transport message, or an uplink NAS transport message. When the first message is an uplink generic NAS transport message or an uplink NAS transport message, after sending a detach request message to the core network management entity, the terminal sends the first message. The first message includes an indication that all applications on the terminal are offline, or an indication that the terminal is unreachable, or an empty application information list, where the terminal learns that a detach request message needs to be sent to the core network management entity. For example, when the first message is a detach message, an Inform Proxy information element is added to the detach message, and the Inform Proxy includes indication information that all applications on the terminal are offline, indication information that the terminal is offline, or an empty application information list.

Alternatively, the first message is a location update request message, or an uplink generic NAS transport message, or an uplink NAS transport message. When the first message is an uplink generic NAS transport message or an uplink NAS transport message, after sending a location update request message to the core network management entity, the terminal sends the first message. The first message includes an indication that an online state of all applications on the terminal is not changed, or an indication that the terminal is reachable, or an information list of all applications in an online state on the terminal, where the terminal learns that the location update request message needs to be sent to the core network management entity.

Further, the request message may further include an address of the proxy server.

Step 402: Obtain the address of the proxy server.

Information about subscription of the terminal to the proxy server is saved in the core network management entity, and the information about subscription includes the address of the proxy server of the terminal. The core network management entity obtains the address of the proxy server from the information about subscription of the terminal.

Alternatively, a correspondence between the terminal and the proxy server is saved in the core network management entity, and the core network management entity obtains the address of the proxy server according to the saved correspondence.

Alternatively, when the first message includes the address of the proxy server, the core network management entity may directly obtain the address, of the proxy server, included in the first message.

Step 403: Send indication information to the proxy server corresponding to the address, so that the proxy server learns the online state of the one or more applications on the terminal at least according to the indication information.

The foregoing steps specifically include:

Scheme 1: the core network management entity sends a second message to the proxy server corresponding to the address, where the second message includes the first indication information, so that the proxy server learns the online state of the one or more applications on the terminal at least according to the first indication information; or obtains an address of an intermediate server at least according to the first message, and sends a second message to the intermediate server, where the second message includes the address of the proxy server and the first indication information, so that the intermediate server sends the first indication information to the proxy server according to the address of the proxy server, and thereby the proxy server learns the online state of the one or more applications on the terminal at least according to the first indication information.

Scheme 2: the core network management entity generates the second indication information at least according to the first indication information; and the core network management entity sends a second message to the proxy server corresponding to the address, where the second message includes the second indication information, so that the proxy server learns the online state of the one or more applications on the terminal at least according to the second indication information; or obtains an address of an intermediate server (for example, InterWorking Function (IWF)) at least according to the first message, and sends a second message to the intermediate server, where the second message includes the address of the proxy server and the second indication information, so that the intermediate server sends the second indication information to the proxy server according to the address of the proxy server, and thereby the proxy server learns the online state of the one or more applications on the terminal at least according to the second indication information.

If the second indication information needs to be generated according to the first indication information, a coding manner of the first indication information may be changed to generate the second indication information. For example, because the amount of data that a location update request message can carry is limited, information about an application in the first indication information may be compressed and coded, and the core network management entity decompresses the compressed and coded information about the application to generate normal information about the application.

Optionally, the second message is a Notification message or a Report message sent by the core network management entity to the proxy server.

Optionally, the Notification message or the Report message carries an identifier of the terminal (preferably, the identifier of the terminal is an international mobile subscriber identity (IMSI)), and an offline indication of the terminal or an empty application information list. Alternatively and optionally, the Notification message or the Report message carries an identifier of the terminal (preferably, the identifier of the terminal is an IMSI), and information about an application changing from an online state into an offline state on the terminal, or an information list of all applications in an online state on the terminal.

Further, the Notification message or the Report message may directly be sent by using a mobile application part (MAP) message, or may also be sent by using an IP bearer.

Specifically, for a 3G network, the core network management entity may be an SGSN, and the location update request message may be an RAU request message; or, the core network management entity may be an MSC, and the location update request message may be an LAU request message; while for a 4G network, the core network management entity may be an MME, and the location update request message may be a TAU request message.

In this embodiment of the present invention, after receiving a first message of a terminal, where the first message includes first indication information, a core network management entity sends the first indication information to a proxy server, so that the proxy server learns an online state of an application on the terminal; or generates second indication information according to the first indication information, and sends the second indication information to a proxy server, so that the proxy server learns an online state of an application on the terminal, so as to avoid that an online state, of the application on the terminal, saved in the proxy server is incorrect.

Embodiment 3

Figure 5:
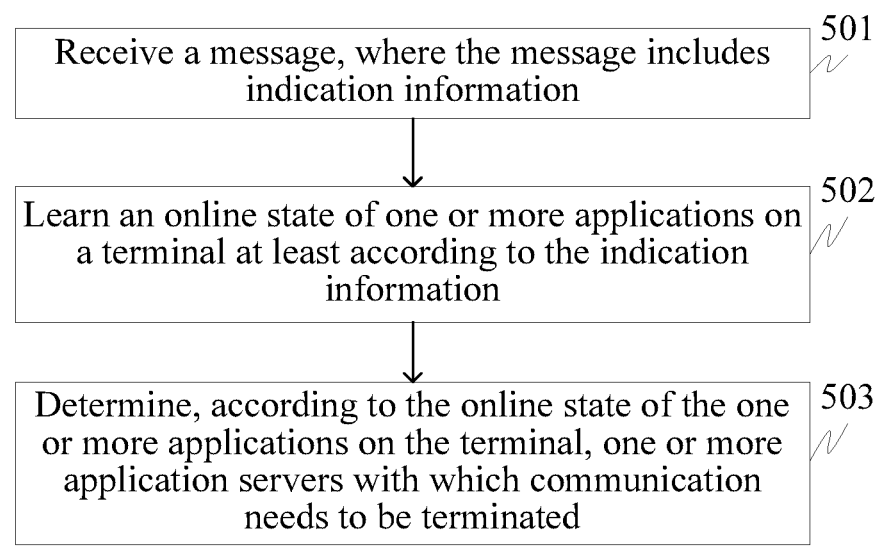
FIG. 5 is a flowchart of a method for learning an online state of a terminal according to Embodiment 3 of the present invention.

FIG. 5 is a flowchart of a method for learning an online state of a terminal according to the embodiment of the present invention. In this embodiment of the present invention, a proxy server receives a message, where the message includes indication information; learns an online state of one or more applications on the terminal at least according to the indication information; and determines, according to the online state of the one or more applications on the terminal, one or more application servers with which communication needs to be terminated, and sends an offline message to the one or more application servers with which communication needs to be terminated, so that the one or more application servers learn that the one or more applications corresponding to the one or more application servers on the terminal are already in an offline state; or determines, according to the online state of the one or more applications on the terminal, one or more application servers with which communication needs to be maintained, and maintains communication with the one or more application servers with which communication needs to be maintained. The method specifically includes:

Step 501: Receive the message, where the message includes the indication information.

A message sent by a core network management entity is received, and optionally, the message is a Notification message or a Report message sent by the core network management entity to the proxy server.

The Notification message or the Report message carries an identifier of the terminal (preferably, the identifier of the terminal is an IMSI), and an offline indication of the terminal or an empty application information list. Alternatively and optionally, the Notification message or the Report message carries an identifier of the terminal (preferably, the identifier of the terminal is an IMSI), and information about and an indication message of an application changing from an online state into an offline state on the terminal (the indication message is used for indicating that an application of the identifier has already changed from an online state into an offline state), or an information list of applications still running on the terminal. Alternatively and optionally, the Notification message or the Report message carries an identifier of the terminal (preferably, the identifier of the terminal is an IMSI), and an indication that the terminal is still reachable or an information list of applications still in an online state on the terminal.

Step 502: Learn the online state of the one or more applications on the terminal at least according to the indication information.

After the indication message is received, an application server with which communication needs to be terminated or an application server with which communication needs to be maintained is determined according to the indication message.

Specifically, if the indication message carries the identifier of the terminal, and the indication that the terminal is offline or the empty application information list, and the proxy server determines that the terminal is already offline according to the offline indication or the empty application information list, communication with all application servers needs to be terminated.

If the indication message carries the identifier of the terminal, and information about and a special indication of an application changing from an online state into an offline state on the terminal (the special indication is used for indicating that an application of the identifier has already changed from an online state into an offline state), and the proxy server determines, according to the information about and the special indication of the application changing from an online state into an offline state on the terminal, that the application on the terminal has already changed from an online state into an offline state, communication with an application server corresponding to the application needs to be terminated.

If the indication message carries the identifier of the terminal, and an information list of applications still running on the terminal, it is determined that communication with the application servers corresponding to the applications needs to be maintained.

Step 503: Determine, according to the online state of the one or more applications on the terminal, one or more application servers with which communication needs to be terminated, and send an offline message to the one or more application servers with which communication needs to be terminated, so that the one or more application servers learn that the one or more applications corresponding to the one or more application servers on the terminal are already in an offline state; or determine, according to the online state of the one or more applications on the terminal, one or more application servers with which communication needs to be maintained, and maintain communication with the one or more application servers with which communication needs to be maintained.

An offline message is sent to the application server with which communication needs to be terminated to terminate communication with the application server, so that the application server learns that the application having already changed from an online state into an offline state is already offline.

Alternatively, a heartbeat message is sent to the application server with which communication needs to be maintained to maintain heartbeat communication.

Alternatively, an indication message is sent to the application server with which communication needs to be maintained, so that the application server learns that the terminal is still online, heartbeat communication does not need to be maintained between the proxy server and the application server, and when the application server needs to send data to an application on the terminal, the application server directly sends the data to the proxy server, where the indication message may include identifier information of the terminal.

Specifically, for a 3G network, the core network management entity may be an SGSN; or, the core network management entity may be an MSC; while for a 4G network, the core network management entity may be an MME.

Further, after the proxy server receives the message, and learns the online state of the one or more applications on the terminal at least according to the message, the method further includes: resetting a timer, where the timer is sent by the terminal to the proxy server by using a registration or login message when the terminal is registered with or logging in to the proxy server, and a timing interval of the timer is the same as a timing interval of periodic update of the terminal; and when the timer has expired, namely, the timer exceeds a predetermined time, if new indication information is still not received, determining that all applications on the terminal are unreachable, determining one or more application servers with which communication needs to be terminated, and sending an offline message to the one or more application servers with which communication needs to be terminated, so that the one or more application servers learn that an application corresponding to the one or more application servers on the terminal is already in an offline state. This avoids that in some cases, after an exception occurs in an online state of an application on the terminal, an online state of the application is not sent to the network side, and therefore the online state, of the application, saved in the proxy server is incorrect.

In this embodiment of the present invention, a proxy server receives an indication message sent by a core network management entity, and learns an online state of one or more applications on a terminal at least according to the indication information; and determines, according to the online state of the one or more applications on the terminal, one or more application servers with which communication needs to be terminated, and sends an offline message to the one or more application servers with which communication needs to be terminated, so that the one or more application servers learn that the one or more applications corresponding to the one or more application servers on the terminal are already in an offline state; or determines, according to the online state of the one or more applications on the terminal, one or more application servers with which communication needs to be maintained, and maintains communication with the one or more application servers with which communication needs to be maintained. This avoids that the online state, of the application on the terminal, saved in the proxy server is incorrect.

Embodiment 4

Figure 6:
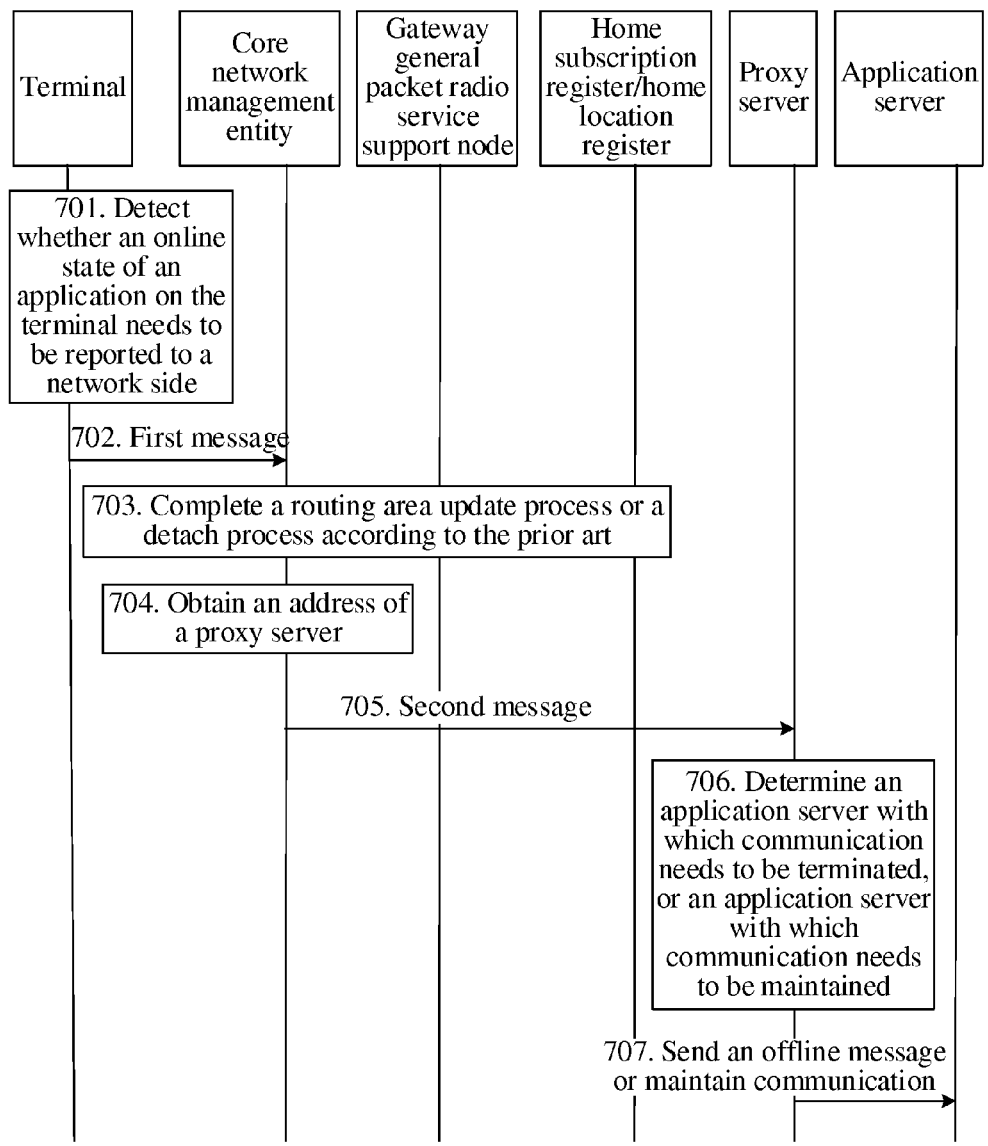
FIG. 6 is a schematic diagram of information exchange between devices of a system for learning an online state of a terminal according to Embodiment 4 of the present invention.

FIG. 6 is a schematic diagram of information exchange between devices of a system for learning an online state of a terminal according to the embodiment of the present invention. In this embodiment of the present invention, when a terminal needs to report an online state of an application on the terminal to a network side, the terminal sends a first message to a core network management entity, after receiving the first message, the core network management entity determines that a second message needs to be sent to a proxy server, and after receiving the second message, the proxy server determines, according to the second message, an application server with which communication needs to be terminated, and sends an offline message to the application server, so that one or more application servers learn that an application corresponding to the one or more application servers on the terminal is already in an offline state; or the proxy server determines an application server with which communication needs to be maintained, and maintains communication with the application server. The method specifically includes:

Step 701: Detect whether the terminal needs to report the online state of the application on the terminal to the network side.

An application on the terminal needs to maintain contact with an application server during running, so that the server learns whether the application on the terminal is online, namely, whether the application is in a reachable state, and thereby information exchange between the terminal and the server may be performed in time.

The proxy server replaces the application to maintain communication between the application and the application server, and when the terminal needs to report an online state of one or more applications on the terminal to the network side, the terminal sends the first message to the core network management entity, where the first message includes the first indication information, so that the core network management entity sends the first indication information to the proxy server, and thereby the proxy server learns the online state of the one or more applications on the terminal at least according to the first indication information; or the terminal sends the first message to the core network management entity, where the first message includes the first indication information, so that the core network management entity generates second indication information at least according to the first indication information, and sends the second indication information to the proxy server, and thereby the proxy server learns the online state of the one or more applications on the terminal at least according to the second indication information.

Specifically, when one or more applications on the terminal change from an online state into an offline state, that the one or more applications are already offline, or an information list of all applications in an online state on the terminal needs to be reported to the network side; when one or more applications on the terminal change from an offline state into an online state, that the one or more applications are already online, or an information list of all applications in an online state on the terminal needs to be reported to the network side; when the terminal receives a power-off instruction or an airplane mode instruction, all applications on the terminal are about to terminate communication with the network side, that all the applications on the terminal are already offline, that the terminal is already unreachable, or an empty application information list needs to be reported to the network side; when the terminal sends a location update request message to the core network management entity due to periodic update or location update, an online application exists on the terminal, and an indication that an online state of all applications on the terminal is not changed, or an indication that the terminal is reachable, or an information list of all the applications in an online state on the terminal needs to be reported to the network side.

Step 702: The terminal sends the first message to the core network management entity.

If one or more applications on the terminal change from an online state into an offline state, the first message is sent to the core network management entity, where the first message specifically includes a location update request message, or a service request message, or an uplink generic NAS transport message, or an uplink NAS transport message. When the first message is an uplink generic NAS transport message or an uplink NAS transport message, after sending a location update request message or a service request message to the core network management entity, the terminal sends the first message. The first message includes: information about the one or more applications changing into an offline state on the terminal, or information about and an offline indication of the one or more applications changing into an offline state on the terminal, or information about the one or more applications changing into an offline state on the terminal and information about changing from an online state into an offline state, or an information list of all applications in an online state on the terminal; or if one or more applications on the terminal change from an offline state into an online state, the first message is sent to the core network management entity, where the first message specifically includes a location update request message, or a service request message, or an uplink generic NAS transport message, or an uplink NAS transport message. When the first message is an uplink generic NAS transport message or an uplink NAS transport message, after sending a location update request message or a service request message to the core network management entity, the terminal sends the first message. The first message includes: information about one or more applications changing into an online state on the terminal, or information about and an online indication of one or more applications changing into an online state on the terminal, or information about one or more applications changing into an online state on the terminal and information about changing from an offline state into an online state, or an information list of all applications in an online state on the terminal; or when the terminal learns that a detach request message needs to be sent to the core network management entity, the terminal sends the first message to the core network management entity, where the first message specifically includes a detach request message, or an uplink generic NAS transport message, or an uplink NAS transport message. When the first message is an uplink generic NAS transport message or an uplink NAS transport message, after sending the detach request message to the core network management entity, the terminal sends the first message. The first message includes an indication that all applications on the terminal are offline, or an indication that the terminal is unreachable, or an empty application information list; or when the terminal learns that a location update request message needs to be sent to the core network management entity, the terminal sends the first message to the core network management entity, where the first message specifically includes a location update request message, or an uplink generic NAS transport message, or an uplink NAS transport message. When the first message is an uplink generic NAS transport message or an uplink NAS transport message, after sending the location update request message to the core network management entity, the terminal sends the first message. The first message includes an indication that an online state of all applications on the terminal is not changed, or an indication that the terminal is reachable, or an information list of all applications in an online state on the terminal.

Step 703: Complete a location update process or a detach process according to the prior art.

Step 704: Obtain an address of the proxy server.

After receiving the first message, the core network management entity learns, according to the first message, that a second message needs to be sent to the proxy server. The address of the proxy server needs to be obtained, and therefore the second message is sent to the proxy server corresponding to the address.

The first message includes an identifier related to the terminal, for example, includes a packet-temporary mobile subscriber identity (P-TMSI), the core network management entity obtains unique identifier information about the terminal according to this identifier, and preferably, this identifier information is an IMSI.

Information about subscription of the terminal to the proxy server is saved in the core network management entity, and the information about subscription includes the address of the proxy server of the terminal. The core network management entity obtains the address of the proxy server from the information about subscription of the terminal.

Alternatively, a correspondence between the terminal and the proxy server is saved in the core network management entity, and the core network management entity obtains the address of the proxy server according to the saved correspondence.

Alternatively, when the first message includes the address of the proxy server, the core network management entity may directly obtain the address, of the proxy server, included in the first message.

Step 705: The core network management entity sends the second message to the proxy server.

The second message is sent to the proxy server corresponding to the address, so that the proxy server learns the online state of the one or more applications on the terminal at least according to the second message.

The foregoing steps specifically include:

Scheme 1: the core network management entity sends the second message to the proxy server corresponding to the address, where the second message includes the first indication information, so that the proxy server learns the online state of the one or more applications on the terminal at least according to the first indication information; or obtains an address of an intermediate server at least according to the first message, and sends the second message to the intermediate server, where the second message includes the address of the proxy server and the first indication information, so that the intermediate server sends the first indication information to the proxy server according to the address of the proxy server, and thereby the proxy server learns the online state of the one or more applications on the terminal at least according to the first indication information.

Scheme 2: the core network management entity generates the second indication information at least according to the first indication information; and the core network management entity sends the second message to the proxy server corresponding to the address, where the second message includes the second indication information, so that the proxy server learns the online state of the one or more applications on the terminal at least according to the second indication information; or obtains an address of an intermediate server (for example, IWF) at least according to the first message, and sends the second message to the intermediate server, where the second message includes the address of the proxy server and the second indication information, so that the intermediate server sends the second indication information to the proxy server according to the address of the proxy server, and thereby the proxy server learns the online state of the one or more applications on the terminal at least according to the second indication information.

If the second indication information needs to be generated according to the first indication information, a coding manner of the first indication information may be changed to generate the second indication information. For example, because the amount of data that a location update request message can carry is limited, information about an application in the first indication information may be compressed and coded, and the core network management entity decompresses the compressed and coded information about the application to generate normal information about the application.

Optionally, the second message is a Notification message or a Report message sent by the core network management entity to the proxy server.

Optionally, the Notification message or the Report message carries an identifier of the terminal (preferably, the identifier of the terminal is an IMSI), and an offline indication of the terminal or an empty application information list. Alternatively and optionally, the Notification message or the Report message carries an identifier of the terminal (preferably, the identifier of the terminal is an IMSI), and information about an application changing from an online state into an offline state on the terminal, or an information list of all applications in an online state on the terminal.

Step 706: Determine, according to the second message, the application server with which communication needs to be terminated, or the application server with which communication needs to be maintained.

After the second message is received, the application server with which communication needs to be terminated or the application server with which communication needs to be maintained is determined according to the second message.

Specifically, if the indication message carries the identifier of the terminal, and the offline indication of the terminal or the empty application information list, and the proxy server determines that the terminal is already offline according to the offline indication or the empty application information list, communication with all application servers needs to be terminated.

If the indication message carries the identifier of the terminal, and information about and a special indication of an application changing from an online state into an offline state on the terminal (the special indication is used for indicating that an application of the identifier has already changed from an online state into an offline state), and the proxy server determines, according to the information about and the special indication of the application changing from an online state into an offline state on the terminal, that the application on the terminal has already changed from an online state into an offline state, communication with an application server corresponding to the application needs to be terminated.

If the indication message carries the identifier of the terminal, and an information list of applications still running on the terminal, it is determined that communication with the application servers corresponding to the applications needs to be maintained.

Step 707: Send the offline message to the application server with which communication needs to be terminated, so that the one or more application servers learn that an application corresponding to the one or more application servers on the terminal is already in an offline state; or maintain communication with the application server with which communication needs to be maintained.

The one or more application servers with which communication needs to be terminated are determined according to the online state of the one or more applications on the terminal, and the offline message is sent to the one or more application servers with which communication needs to be terminated, so that the one or more application servers learn that the one or more applications corresponding to the one or more application servers on the terminal are already in an offline state; or, the one or more application servers with which communication needs to be maintained are determined, and communication with the one or more application servers with which communication needs to be maintained is maintained according to the online state of the one or more applications on the terminal.

An offline message is sent to the application server with which communication needs to be terminated to terminate communication with the application server, so that the application server learns that the application having already changed from an online state into an offline state is already offline.

Alternatively, a heartbeat message is sent to the application server with which communication needs to be maintained to maintain heartbeat communication.

Alternatively, an indication message is sent to the application server with which communication needs to be maintained, so that the application server learns that the terminal is still online, heartbeat communication does not need to be maintained between the proxy server and the application server, and when the application server needs to send data to an application on the terminal, the application server directly sends the data to the proxy server, where the indication message may include identifier information about the terminal.

The method further includes resetting a timer, where the timer is sent by the terminal to the proxy server by using a registration or login message when the terminal is registered with or logging in to the proxy server, and a timing interval of the timer is the same as a timing interval of periodic update of the terminal; and when the timer has expired, namely, the timer exceeds a predetermined time, if new indication information is still not received, determining that all applications on the terminal are unreachable, determining one or more application servers with which communication needs to be terminated, and sending an offline message to the one or more application servers with which communication needs to be terminated, so that the one or more application servers learn that an application corresponding to the one or more application servers on the terminal is already in an offline state. This avoids that in some cases, after an exception occurs in an online state of an application on the terminal, an online state of the application is not sent to the network side, and therefore the online state, of the application, saved in the proxy server is incorrect.

Specifically, for a 3G network, the core network management entity may be an SGSN, and the location update request message may be an RAU request message; or, the core network management entity may be an MSC, and the location update request message may be an LAU request message; while for a 4G network, the core network management entity may be an MME, and the location update request message may be a TAU request message.

In this embodiment of the present invention, when an online state of an application on a terminal needs to be reported to a network side, the terminal sends a first message to a core network management entity, where the first message includes first indication information; the core network management entity sends the first indication information to a proxy server, so that the proxy server learns an online state of one or more applications on the terminal at least according to the first indication information; or generates second indication information at least according to the first indication information, and sends the second indication information to a proxy server corresponding to an address, so that the proxy server learns an online state of one or more applications on the terminal at least according to the second indication information; the proxy server determines, according to the online state of the one or more applications on the terminal, one or more application servers with which communication needs to be terminated, and sends an offline message to the one or more application servers with which communication needs to be terminated, so that the one or more application servers learn that the one or more applications corresponding to the one or more application servers on the terminal are already in an offline state; or determines, according to the online state of the one or more applications on the terminal, one or more application servers with which communication needs to be maintained, and maintains communication with the one or more application servers with which communication needs to be maintained, and thereby the application server correctly learns the online state of the application on the terminal.

Embodiment 5

Figure 7:
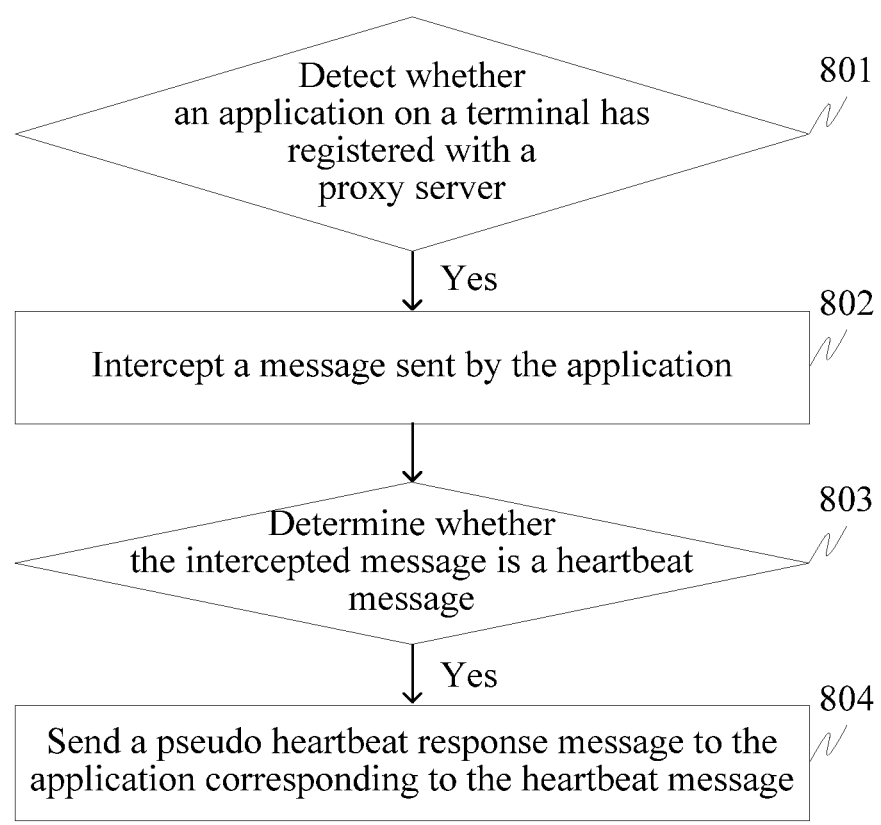
FIG. 7 is a flowchart of a method for processing a heartbeat message of a terminal according to Embodiment 5 of the present invention.

Because no heartbeat message needs to be maintained between an application on a terminal and an application server, and instead, a proxy server replaces the application to maintain heartbeat communication between the application and the application server corresponding to the application. In this case, the application on the terminal still sends a heartbeat message, and if no heartbeat response message can be received from a network side, it is incorrectly determined that a network error occurs. FIG. 7 is a schematic diagram of a method for processing a heartbeat message of a terminal according to the embodiment of the present invention. In this embodiment of the present invention, when an application on the terminal is registered with a proxy server, the terminal records registration information of the application, and when the terminal detects that the application is about to send a message to a network side, the terminal intercepts the message, and determines whether the message is a heartbeat message; and if the message is a heartbeat message, generates a pseudo heartbeat response message in response to the application. The method specifically includes:

Step 801: Detect whether one or more applications on the terminal have registered with the proxy server.

When the proxy server needs to replace an application on the terminal to maintain communication between the application and an application server, the terminal needs to register with the proxy server, and when the application on the terminal is registered with the proxy server, the terminal records registration information of the application. It is detected whether one or more applications on the terminal have registered with the proxy server, and if already registered, a heartbeat message sent by the one or more registered applications on the terminal needs to be processed.

Step 802: When the one or more applications have registered with the proxy server, intercept a message sent by the one or more applications.

When it is detected that the one or more applications on the terminal have registered with the proxy server, the message sent by the one or more applications on the terminal is intercepted, namely, the message is obtained, and the message is prevented from being sent to the network side.

Step 803: Determine whether the intercepted message is a heartbeat message.

Step 804: If the intercepted message is a heartbeat message, send a pseudo heartbeat response message to the one or more applications corresponding to the heartbeat message.

If it is determined that the intercepted message is a heartbeat message, a response manner of the heartbeat message needs to be obtained. Optionally, information about the application that sends the heartbeat message is obtained, and then the response manner of the heartbeat message is obtained according to the information about the application. The pseudo heartbeat response message here may be obtained by the terminal according to information stored in advance on the terminal, or be recorded by the terminal when the application and the application server perform normal heartbeat communication.

After the response manner of the heartbeat message is obtained, the pseudo heartbeat response message corresponding to the heartbeat message is generated, and the pseudo heartbeat response message is the same as a heartbeat response message sent by the network side in a normal condition, so that the terminal does not incorrectly considers that a network error occurs.

The pseudo heartbeat response message is sent to the application corresponding to the heartbeat message.

In this embodiment of the present invention, when it is detected that one or more applications on a terminal have registered with a proxy server, a heartbeat message of the one or more applications on the terminal is intercepted, and a pseudo heartbeat response message is generated in response to the one or more applications on the terminal, so that the application on the terminal can maintain normal heartbeat communication, and therefore the terminal does not incorrectly determine that a network error occurs.

Embodiment 6

Figure 8:
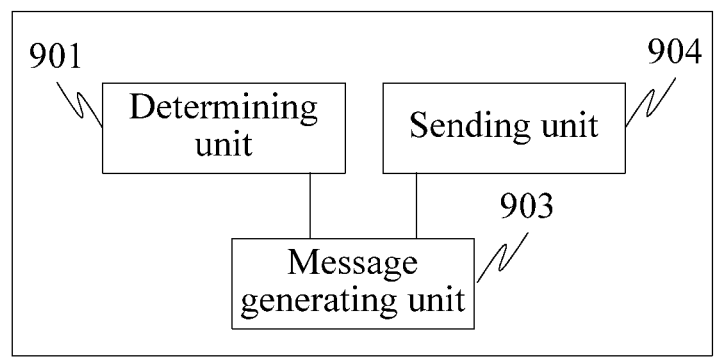
FIG. 8 is a schematic structural diagram of a terminal according to Embodiment 6 of the present invention.

FIG. 8 is a schematic structural diagram of a terminal according to the embodiment of the present invention. In this embodiment of the present invention, the terminal includes a determining unit 901, a message generating unit 903, and a sending unit 904, where the determining unit 901 is configured to determine whether a first message needs to be sent to a core network management entity; the message generating unit 903 is configured to: when a determining result of the determining unit 901 is yes, generate the first message, where the first message includes first indication information, and the first message is used for enabling the core network management entity to send the first indication information to a proxy server, and enabling the proxy server to learn an online state of one or more applications on the terminal; or, enabling the core network management entity to generate second indication information at least according to the first indication information, and send the second indication information to a proxy server, and enabling the proxy server to learn an online state of one or more applications on the terminal; and the sending unit 904 is configured to send the first message generated by the message generating unit 903 to the core network management entity.

Figure 9:
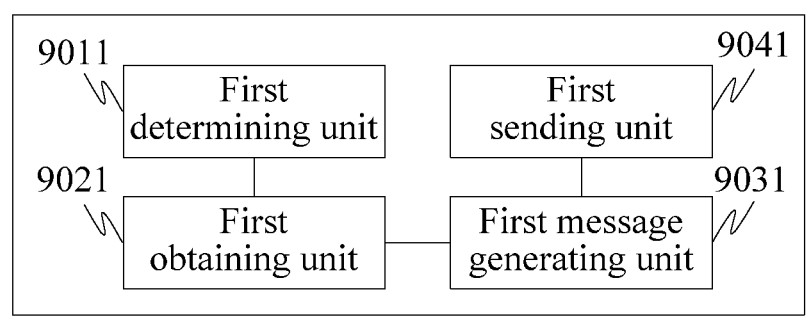
FIG. 9 is a schematic structural diagram of another terminal according to Embodiment 6 of the present invention.

Optionally, as shown in FIG. 9, the determining unit 901 includes a first determining unit 9011, the message generating unit 903 includes a first message generating unit 9031, the sending unit 904 includes a first sending unit 9041, and the terminal further includes a first obtaining unit 9021, where the first determining unit 9011 is configured to determine whether one or more applications on the terminal change from an online state into an offline state, or one or more applications on the terminal change from an offline state into an online state; the first obtaining unit 9021 is configured to: when the first determining unit 9011 determines that one or more applications change from an online state into an offline state, obtain information about the one or more applications changing into an offline state on the terminal, or an information list of all applications in an online state on the terminal; or when the first determining unit 9011 determines that one or more applications change from an offline state into an online state, obtain information about the one or more applications changing into an online state on the terminal, or an information list of all applications in an online state on the terminal; the first message generating unit 9031 is configured to: according to a result obtained by the first obtaining unit 9021, generate the first message, where the first message may be a location update request message, or a service request message, or an uplink generic NAS transport message, or an uplink NAS transport message; when the first message is an uplink generic NAS transport message or an uplink NAS transport message, after sending a location update request message or a service request message to the core network management entity, the terminal sends the first message; the first message includes: information about the one or more applications changing into an offline state on the terminal, or information about and an offline indication of the one or more applications changing into an offline state on the terminal, or information about the one or more applications changing into an offline state on the terminal and information about changing from an online state into an offline state, or an information list of all applications in an online state on the terminal; or the first message includes: information about the one or more applications changing into an online state on the terminal, or information and an online indication of the one or more applications changing into an online state on the terminal, or information about the one or more applications changing into an online state on the terminal and information about the change from an offline state into an online state, or an information list of all applications in an online state on the terminal; and the first sending unit 9041 is configured to send the first message generated by the first message generating unit 9031 to the core network management entity.

Figure 10:
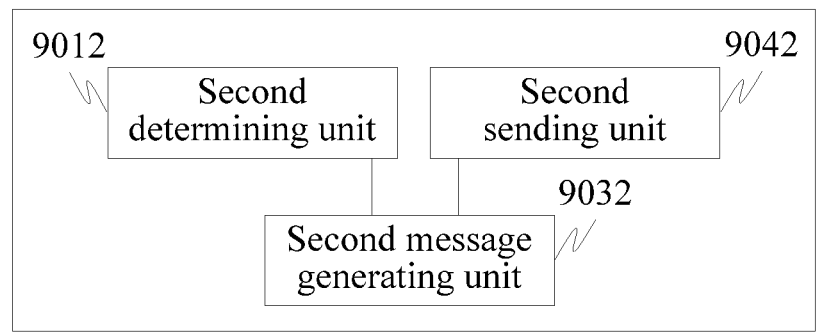
FIG. 10 is a schematic structural diagram of another terminal according to Embodiment 6 of the present invention.

Optionally, as shown in FIG. 10, the determining unit 901 includes a second determining unit 9012, the message generating unit 903 includes a second message generating unit 9032, and the sending unit 904 includes a second sending unit 9042, where the second determining unit 9012 is configured to: when the terminal learns that a detach request message needs to be sent to the core network management entity, determine whether an application in an online state exists on the terminal.

The method for learning that a detach request message needs to be sent to the core network management entity includes: when the terminal receives a power-off instruction or an instruction for enabling an airplane mode, learning that the detach request message needs to be sent to the core network management entity; the second message generating unit 9032 is configured to: when a determining result of the second determining unit 9012 is yes, generate a first message, where the first message includes a detach request message, an uplink generic NAS transport message or an uplink NAS transport message; when the first message is an uplink generic NAS transport message or an uplink NAS transport message, after sending a detach request message to the core network management entity, the terminal sends the first message; the first message includes an indication that all applications on the terminal are offline, an indication that the terminal is unreachable, or an empty application information list; and the second sending unit 9042 is configured to send the first message generated by the second message generating unit 9032 to the core network management entity.

Figure 11:
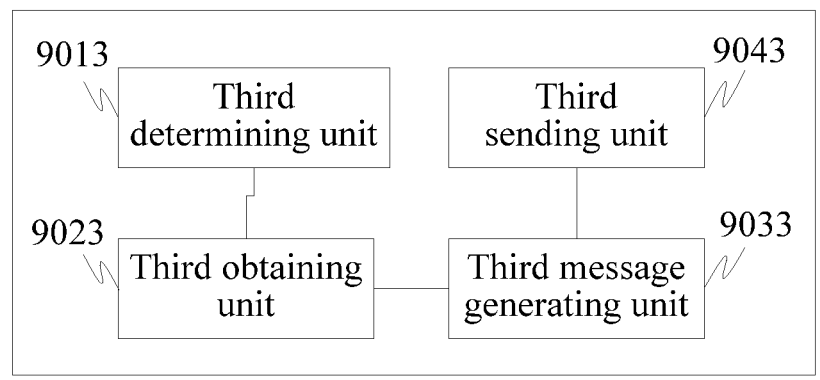
FIG. 11 is a schematic structural diagram of another terminal according to Embodiment 6 of the present invention.

Optionally, as shown in FIG. 11, the determining unit 901 includes a third determining unit 9013, the message generating unit 903 includes a third message generating unit 9033, the sending unit 904 includes a third sending unit 9043, and the terminal further includes a third obtaining unit 9023, where the third determining unit 9013 is configured to: when the terminal sends a location update request message to the core network management entity due to periodic update or location update, determine whether an application in an online state exists on the terminal; the third obtaining unit 9023 is configured to: when a determining result of the third determining unit 9013 is yes, obtain an information list of applications in an online state on the terminal; the third message generating unit 9033 is configured to: according to a result obtained by the third obtaining unit 9023, generate the first message, where the first message specifically includes a location update request message, or an uplink generic NAS transport message, or an uplink NAS transport message; when the first message is an uplink generic NAS transport message or an uplink NAS transport message, after sending a location update request message to the core network management entity, the terminal sends the first message; the first message includes an indication that online states of all applications on the terminal are not changed, or an indication that the terminal is reachable, or an information list of all applications in an online state on the terminal; and the third sending unit 9043 is configured to send the first message generated by the third message generating unit 9033 to the core network management entity.

Specifically, for a 3G network, the core network management entity may be an SGSN, and the location update request message may be an RAU request message; or, the core network management entity may be an MSC, and the location update request message may be an LAU request message; while for a 4G network, the core network management entity may be an MME, and the location update request message may be a TAU request message.

In this embodiment of the present invention, when a terminal needs to report an online state of an application on the terminal to a network side, the terminal sends a first message to a core network management entity to instruct the core network management entity to send a second message to a proxy server, so that the proxy server learns an online state of the application on the terminal, so as to avoid that an online state, of the application on the terminal, saved in the proxy server is incorrect.

Embodiment 7

Figure 12:
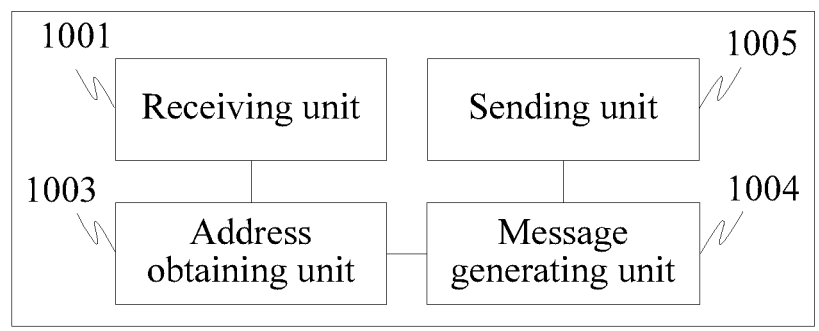
FIG. 12 is a schematic structural diagram of a core network management entity according to Embodiment 7 of the present invention.

FIG. 12 is a schematic structural diagram of a core network management entity according to the embodiment of the present invention. In this embodiment of the present invention, the core network management entity includes a receiving unit 1001, an address obtaining unit 1003, a message generating unit 1004, and a sending unit 1005, where the receiving unit 1001 is configured to receive a first message sent by a terminal, where the first message includes first indication information; the address obtaining unit 1003 is configured to obtain an address of a proxy server; and the sending unit 1005 is configured to send the first indication information to the proxy server corresponding to the address, so that the proxy server learns an online state of one or more applications on the terminal at least according to the first indication information; or the terminal further includes a second indication message generating unit, where the second indication message generating unit generates second indication information at least according to the first indication information; the sending unit 1005 is configured to send the second indication information to the proxy server corresponding to the address, so that the proxy server learns an online state of one or more applications on the terminal at least according to the second indication information.

Specifically, the sending unit 1005 sends a second message to the proxy server corresponding to the address, where the second message includes the first indication information, so that the proxy server learns the online state of the one or more applications on the terminal; or obtains an address of an intermediate server at least according to the first message, and sends a second message to the intermediate server, where the second message includes the address of the proxy server and the first indication information, so that the intermediate server sends the first indication information to the proxy server according to the address of the proxy server, and thereby the proxy server learns the online state of the one or more applications on the terminal.

Alternatively, the sending unit 1005 sends a second message to the proxy server corresponding to the address, where the second message includes the second indication information, so that the proxy server learns the online state of the one or more applications on the terminal at least according to the second indication information; or obtains an address of an intermediate server at least according to the first message, and sends a second message to the intermediate server, where the second message includes the address of the proxy server and the second indication information, so that the intermediate server sends the second indication information to the proxy server according to the address of the proxy server, and thereby the proxy server learns the online state of the one or more applications on the terminal at least according to the second indication information.

Further, the address obtaining unit 1003 is specifically configured to: obtain the address of the proxy server according to information about subscription of the terminal saved in the core network management entity; or obtain the address of the proxy server according to a correspondence that is between the terminal and the proxy server and is saved by the core network management entity; or obtain the address of the proxy server included in the first message, where the first message includes the address of the proxy server.

Further, the receiving unit 1001 is specifically configured to: receive the first message sent by the terminal, where the first message may be a location update request message, or a service request message, or an uplink generic NAS transport message, or an uplink NAS transport message; when the first message is an uplink generic NAS transport message or an uplink NAS transport message, after sending a location update request message or a service request message to the core network management entity, the terminal sends the first message; the first message includes: information about one or more applications changing into an offline state on the terminal, or information about and an offline indication of one or more applications changing into an offline state on the terminal, or information about one or more applications changing into an offline state on the terminal and information about changing from an online state into an offline state, or an information list of all applications in an online state on the terminal, where the one or more applications on the terminal change from an online state into an offline state; or receive the first message sent by the terminal, where the first message specifically includes a location update request message, or a service request message, or an uplink generic NAS transport message, or an uplink NAS transport message; when the first message is an uplink generic NAS transport message or an uplink NAS transport message, after sending a location update request message or a service request message to the core network management entity, the terminal sends the first message; the first message includes: information about one or more applications changing into an online state on the terminal, or information about and an online indication of one or more applications changing into an online state on the terminal, or information about one or more applications changing into an online state on the terminal and information about changing from an offline state into an online state, or an information list of all applications in an online state on the terminal, where the one or more applications on the terminal change from an offline state into an online state.

Alternatively, the receiving unit 1001 is configured to receive the first message sent by the terminal, where the first message may be a detach request message, or an uplink generic NAS transport message, or an uplink NAS transport message. When the first message is an uplink generic NAS transport message or an uplink NAS transport message, after sending a detach request message to the core network management entity, the terminal sends the first message. The first message includes indication information that all applications on the terminal are offline, or an indication that the terminal is unreachable, or an empty application information list, where the terminal learns that a detach request message needs to be sent to the core network management entity.

Alternatively, the receiving unit 1001 is configured to receive the first message sent by the terminal, where the first message may be a location update request message, or an uplink generic NAS transport message, or an uplink NAS transport message. When the first message is an uplink generic NAS transport message or an uplink NAS transport message, after sending a location update request message to the core network management entity, the terminal sends the first message. The first message includes indication information that online states of all applications on the terminal are not changed, or an indication that the terminal is reachable, or an information list of all applications in an online state on the terminal, where the terminal learns that a location update request message needs to be sent to the core network management entity.

Specifically, for a 3G network, the core network management entity may be an SGSN; or, the core network management entity may be an MSC; for a 4G network, the core network management entity may be an MME.

In this embodiment of the present invention, after receiving a first message of a terminal, where the first message includes first indication information, a core network management entity sends the first indication information to a proxy server, so that the proxy server learns an online state of an application on the terminal; or converts the first indication information into second indication information, and sends the second indication information to a proxy server, so that the proxy server learns an online state of an application on the terminal, so as to avoid that an online state, of the application on the terminal, saved in the proxy server is incorrect.

Embodiment 8

Figure 13:
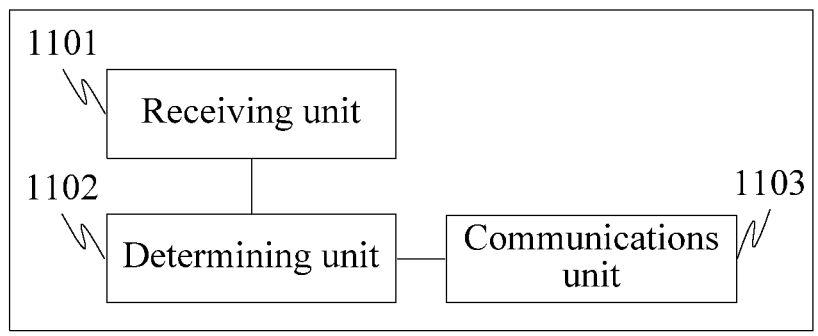
FIG. 13 is a schematic structural diagram of a proxy server according to Embodiment 8 of the present invention.

FIG. 13 is a schematic structural diagram of a proxy server according to the embodiment of the present invention. In this embodiment of the present invention, the proxy server includes: a receiving unit 1101, a determining unit 1102, and a communications unit 1103, where the receiving unit 1101 is configured to receive a message sent by a core network management entity, where the message includes indication information; the determining unit 1102 is configured to learn an online state of one or more applications on a terminal at least according to the indication information received by the receiving unit 1101; and the communications unit 1103 is configured to determine, according to the online state of the one or more applications on the terminal, one or more application servers with which communication needs to be terminated, and send an offline message to the one or more application servers with which communication needs to be terminated, so that the one or more application servers learn that the one or more applications corresponding to the one or more application servers on the terminal are already in an offline state or terminate communication with the one or more application servers; or determine, according to the online state of the one or more applications on the terminal, one or more application servers with which communication needs to be maintained, and maintain communication with the one or more application servers with which communication needs to be maintained.

Further, the proxy server further includes a timer, where after the receiving unit receives the message, the timer is reset, and a timing interval of the timer is the same as a timing interval of periodic update of the terminal.

The proxy server further includes a second determining unit, where the second determining unit is configured to: when the timer has expired, if the receiving unit still does not receive new indication information, determine that all applications on the terminal are unreachable; the determining unit is configured to: when the second determining unit determines that all the applications on the terminal are unreachable, determine one or more application servers with which communication needs to be terminated; and the communications unit is configured to send an offline message to the one or more application servers with which communication needs to be terminated, and terminate communication with the application server.

Specifically, for a 3G network, the core network management entity may be an SGSN; or, the core network management entity may be an MSC; for a 4G network, the core network management entity may be an MME.

In this embodiment of the present invention, a proxy server receives an indication message sent by a core network management entity, and determines, according to the indication message, an application server with which communication needs to be terminated or an application server with which communication needs to be maintained; sends an offline message to the application server with which communication needs to be terminated, and terminates communication with the application server; or sends an indication message or a heartbeat message to the application server with which communication needs to be maintained, and maintains communication with the application server. This avoids that an online state, of the application on the terminal, saved in the proxy server is incorrect.

Embodiment 9

Figure 14:
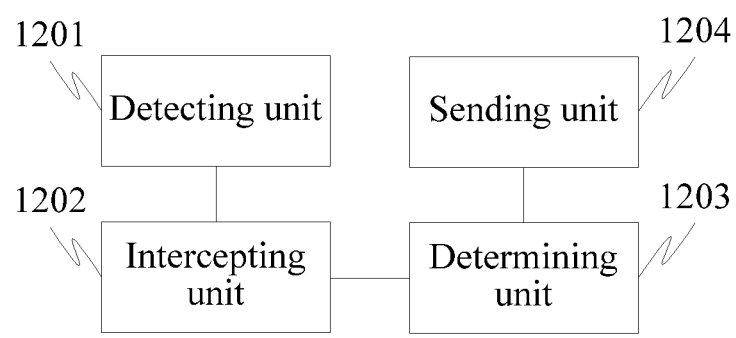
FIG. 14 is a schematic structural diagram of another terminal according to Embodiment 9 of the present invention.

FIG. 14 is a schematic structural diagram of another terminal according to the embodiment of the present invention. The terminal includes: a detecting unit 1201, an intercepting unit 1202, a determining unit 1203, and a sending unit 1204, where the detecting unit 1201 is configured to detect whether one or more applications on the terminal have registered with a proxy server; the intercepting unit 1202 is configured to: when the detecting unit 1201 detects that the one or more applications have registered with the proxy server, intercept a message that is generated by the one or more applications and sent by the terminal; the determining unit 1203 is configured to determine whether the message intercepted by the intercepting unit 1202 is a heartbeat message; and the sending unit 1204 is configured to send a pseudo heartbeat response message to the one or more applications corresponding to the heartbeat message.

Figure 15:
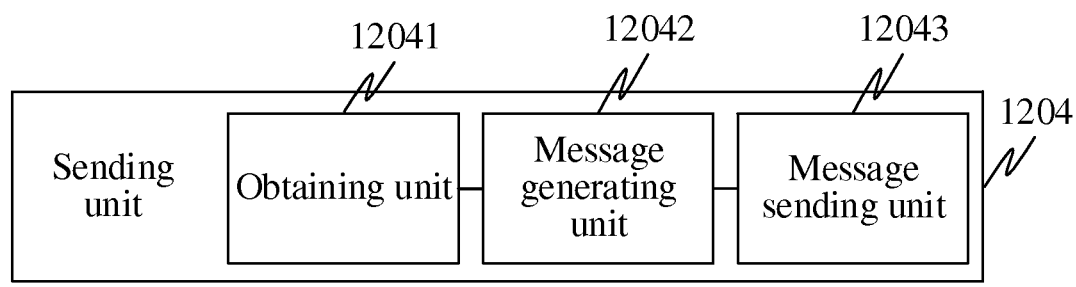
FIG. 15 is a schematic structural diagram of a sending unit of the terminal according to Embodiment 9 of the present invention.

Further, as shown in FIG. 15, the sending unit 1204 includes: an obtaining unit 12041, a message generating unit 12042, and a message sending unit 12043, where the obtaining unit 12041 is configured to obtain a response manner of the heartbeat message; the message generating unit 12042 is configured to generate the pseudo heartbeat response message according to the response manner of the heartbeat message; and the message sending unit 12043 is configured to send the pseudo heartbeat response message generated by the message generating unit 12042 to the one or more applications corresponding to the heartbeat message.

Figure 16:
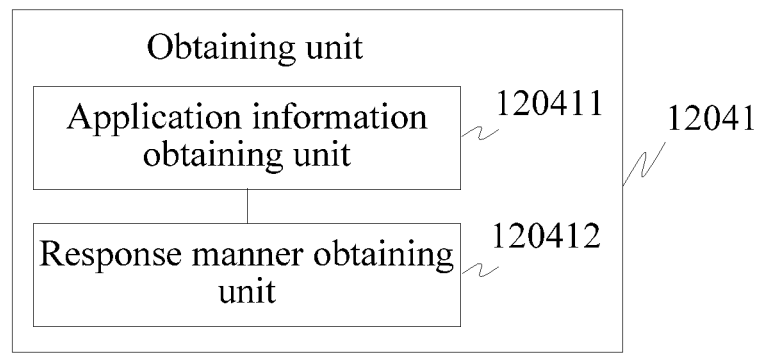
FIG. 16 is a schematic structural diagram of an obtaining unit of the terminal according to Embodiment 9 of the present invention.

Further, as shown in FIG. 16, the obtaining unit 12041 includes an application information obtaining unit 120411 and a response manner obtaining unit 120412, where the application information obtaining unit 120411 is configured to obtain information about one or more applications sending the heartbeat message; and the response manner obtaining unit 120412 is configured to obtain the response manner of the heartbeat message according to the information about the one or more applications.

In this embodiment of the present invention, when it is detected that an application on a terminal is already registered with a proxy server, a heartbeat message sent by the application is intercepted, and a pseudo heartbeat response message is generated in response to the application, so that the application on the terminal can maintain normal heartbeat communication, and therefore the terminal does not incorrectly determine that a network error occurs.

It should be noted that because the content such as the information exchange and execution procedure between units in the apparatus and the system is based on the same conception as that in the method embodiment of the present invention, reference may be made to the description in the method embodiment of the present invention for the specific content, which is not repeated again herein.

All or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random-access memory (RAM), a magnetic disk, or an optical disc.

Although the present invention is described above with some exemplary embodiments, the protection scope of the present invention is not limited thereby. Various variations and replacements that can be easily thought of by a person skilled in the art without departing from the technical scope of the present invention shall fall within the protection scope of the present invention. Therefore, the protection scope of the present invention shall be subject to the protection scope of the claims.

What is claimed is:

1. A mobile terminal comprising:
a processor coupled to a memory configured to:
determine that a first message needs to be sent to a core network management entity when a status of an application located on the mobile terminal changes between offline and online states;
generate the first message when the first message needs to be sent to the core network management entity, wherein the first message comprises first indication information configured to cause the core network management entity to send a notification to a proxy server such that the notification informs the proxy server of the status of the application located on the mobile terminal;
send the first message to the core network management entity;
determine that the application located on the mobile terminal has a status of offline when the mobile terminal determines that a detach request message needs to be sent to the core network management entity, wherein the first indication information comprises an indication that all applications on the mobile terminal have the status of offline, an indication that the mobile terminal is unreachable, or an empty application information list when the mobile terminal determines that the application has the status of offline;
determine that the application located on the mobile terminal has a status of online when the mobile terminal learns that a location update request message needs to be sent to the core network management entity; and
obtain an information list of applications having the online status on the mobile terminal, wherein the first indication information comprises an indication that online statuses of all applications on the mobile terminal are not changed, an indication that the mobile terminal is reachable, or an information list of all applications having the online status on the mobile terminal.

2. The mobile terminal of claim 1, wherein the notification information comprises the first indication information.

3. The mobile terminal of claim 1, wherein the notification information comprises second indication information generated by the processor and based at least in part on the first indication information.

4. A core network management entity, comprising:
a processor coupled to a memory configured to:
receive a first message sent by a mobile terminal when a status of an application located on the mobile terminal changes between offline and online states, wherein the first message comprises first indication information;
obtain an address of a proxy server and notification information based at least in part on the first indication information to the proxy server corresponding to the address to inform the proxy server of the status of the application located on the mobile terminal;
obtain an address of an intermediate server at least according to the first message; and
send a second message to the intermediate server, wherein the second message comprises the first indication message or the address of the proxy server and the first indication information to cause the intermediate server to send the first indication information to the proxy server according to the address of the proxy server to inform the proxy server of the status of the application located on the mobile terminal at least according to the first indication information;
wherein the first indication information comprises an indication that all applications on the mobile terminal are offline, and indication that the mobile terminal is unreachable, or an empty application information list; or
wherein the first indication information comprises an indication that online states of all applications on the terminal are not changed, an indication that the terminal is reachable, or an information list of all applications in an online state on the terminal.

5. The core network management entity according to claim 4, wherein the processor is further configured to:
obtain the address of the proxy server according to information about subscription of the mobile terminal saved by the core network management entity;
obtain the address of the proxy server according to a correspondence that is between the mobile terminal and the proxy server and is saved by the core network management entity; or
obtain the address of the proxy server comprised in the first message, wherein the first message comprises the address of the proxy server.

6. The core network management entity according to claim 4, wherein the first indication information comprises:
information about one or more applications changing into the offline state on the mobile terminal;
information about an offline indication of one or more applications changing into the offline state on the mobile terminal;
information about one or more applications changing into the offline state on the mobile terminal and information about changing from the online state into the offline state; or
an information list of all applications in the online state on the mobile terminal, and wherein the one or more applications on the mobile terminal change from the online state into the offline state, or
wherein the first indication information comprises:
information about one or more applications changing into the online state on the mobile terminal;
information about an online indication of one or more applications changing into the online state on the mobile terminal;

information about one or more applications changing into the online state on the mobile terminal and information about changing from the offline state into the online state; or an information list of all applications in the online state on the mobile terminal, an wherein the one or more applications on the mobile terminal change from the offline state into the online state.

7. The core network management entity of claim 4, wherein the notification information comprises the first indication information.

8. The core network management entity of claim 4, wherein the notification information comprises second indication information generated by the processor and based at least in part on the first indication information.

9. The core network management entity according to claim 8, wherein the processor is further configured to:
    obtain an address of an intermediate server at least according to the first message; and
    send a second message to the intermediate server, wherein the second message comprises the second indication message or the address of the proxy server and the second indication information to cause the intermediate server to send the second indication information to the proxy server according to the address of the proxy server to inform the proxy server of the status of the application located on the mobile terminal at least according to the second indication information.

10. A proxy server, comprising:
    a processor coupled to a memory configured to:
        receive a message sent by a core network management entity, wherein the message comprises indication information;
        determine an online state of one or more applications located on a mobile terminal at least according to the received indication information; and
        transmit a communication to one or more application servers based at least in part on the online state of the one or more applications; and
    a timer, wherein after the processor receives the message, the processor resets the timer, and wherein a timing interval of the timer is the same as a timing interval of periodic update of the mobile terminal;
    wherein the processor is further configured to:
        determine that all applications on the mobile terminal are unreachable when the timer has expired and the processor has not received new indication information;
        determine one or more application servers with which communication needs to be terminated when all applications on the mobile terminal are unavailable;
        send an offline message to the one or more application servers with which communication needs to be terminated; and
        terminate communication with the one or more application servers.

11. The proxy server of claim 10, wherein transmitting the communication to the one or more application servers based at least in part on the online state of the one or more applications comprises:
    determining, according to the online state of the one or more applications located on the mobile terminal, one or more application servers with which communication needs to be terminated; and
    sending an offline message to the one or more application servers with which communication needs to be terminated to inform the one or more application servers that the one or more applications located on the mobile terminal and corresponding to the one or more application servers are already in an offline state.

12. The proxy server of claim 10, wherein transmitting the communication to the one or more application servers based at least in part on the online state of the one or more applications comprises:
    determining, according to the online state of the one or more applications located on the mobile terminal, one or more application servers with which communication needs to be maintained; and
    maintaining communication with the one or more application servers with which communication needs to be maintained.

* * * * *

UNITED STATES PATENT AND TRADEMARK OFFICE
CERTIFICATE OF CORRECTION

PATENT NO. : 9,699,050 B2  
APPLICATION NO. : 14/296977  
DATED : July 4, 2017  
INVENTOR(S) : Hui Jin, Guodong Xue and Lei Wang Page 1 of 1

It is certified that error appears in the above-identified patent and that said Letters Patent is hereby corrected as shown below:

In the Claims

Column 32, Line 26, Claim 4 should read:
are offline, an indication that the mobile terminal is Column 33, Line 6, Claim 6 should read:
the mobile terminal, and wherein the one or more Signed and Sealed this
Fifth Day of September, 2017

Joseph Matal
*Performing the Functions and Duties of the*
*Under Secretary of Commerce for Intellectual Property and*
*Director of the United States Patent and Trademark Office*